United States Patent
Kang et al.

(10) Patent No.: US 10,899,243 B2
(45) Date of Patent: Jan. 26, 2021

(54) RADIATOR GRILLE CHARGING DOOR APPARATUS

(71) Applicants: Hyundai Motor Company, Seoul (KR); Kia Motors Corporation, Seoul (KR)

(72) Inventors: Jae-Young Kang, Gyeonggi-Do (KR); Tak-Su Kim, Gyeonggi-Do (KR); Jeong-Ho Lee, Suwon-si (KR); Hyung-Jin Park, Incheon (KR); Yun-Woo Chung, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 16/156,545

(22) Filed: Oct. 10, 2018

(65) Prior Publication Data

US 2019/0176635 A1 Jun. 13, 2019

(30) Foreign Application Priority Data

Dec. 12, 2017 (KR) .................. 10-2017-0170601

(51) Int. Cl.
*B60L 53/16* (2019.01)
*E05D 3/02* (2006.01)
*E05D 11/00* (2006.01)

(52) U.S. Cl.
CPC ............ *B60L 53/16* (2019.02); *E05D 3/02* (2013.01); *E05D 3/022* (2013.01); *E05D 2011/009* (2013.01); *E05Y 2900/534* (2013.01)

(58) Field of Classification Search
CPC .. B60L 53/16; E05B 3/02; E05B 3/022; B60J 5/0491
USPC ........................................... 296/97.22
See application file for complete search history.

(56) References Cited

U.S. PATENT DOCUMENTS

| | | | | |
|---|---|---|---|---|
| 2017/0368928 | A1* | 12/2017 | Mori | B60K 15/05 |
| 2018/0236870 | A1* | 8/2018 | Watanabe | B60K 15/0409 |
| 2019/0023126 | A1* | 1/2019 | Khafagy | B60K 15/05 |
| 2019/0248232 | A1* | 8/2019 | Stack | B60L 53/16 |
| 2020/0055389 | A1* | 2/2020 | Herzig | B60K 15/05 |
| 2020/0130505 | A1* | 4/2020 | Yagura | B60K 1/04 |

FOREIGN PATENT DOCUMENTS

KR 10-1575498 B1 12/2015

* cited by examiner

*Primary Examiner* — Jason S Morrow
(74) *Attorney, Agent, or Firm* — Mintz Levin Cohn Ferris Glovsky and Popeo, P.C.; Peter F. Corless

(57) ABSTRACT

A radiator grille charging door apparatus for an electric vehicle for charging the electric vehicle in which a charging port is positioned at an inner side of a radiator grille is provided. The apparatus includes a charging door that has one end formed with a hinge shaft and a hinge connector that is coupled to the hinge shaft of the charging door at one side of the hinge connector. A hinge bracket is coupled to an inside of the hinge connector and a plurality of hinge springs connect the hinge connector and the hinge bracket to each other.

20 Claims, 7 Drawing Sheets

RADIATOR GRILLE CHARGING DOOR APPARATUS

CROSS-REFERENCE(S) TO RELATED APPLICATIONS

This application claims priority to Korean Patent Application No(s). 10-2017-0170601, filed on Dec. 12, 2017, which is incorporated herein by reference in its entirety.

BACKGROUND

Field of the Invention

The present invention relates to a radiator grille charging door apparatus, and more particularly, to a radiator grille charging door apparatus that prevents damage to a charging door of an electric vehicle even when an external force is applied to the charging door of the electric vehicle and that protects a pedestrian even during a collision with the pedestrian.

Description of Related Art

In accordance with constant demands for improvement of fuel efficiency of a vehicle and stringent emission regulation, a demand for an environmentally friendly vehicle has been increasing, and as a real alternative, an environmentally friendly vehicle has been developed. The environmentally friendly vehicle includes a fuel cell vehicle, an electric vehicle, a plug-in electric vehicle, and a hybrid vehicle, and generally is provided with a motor for generating a driving force.

The hybrid vehicle, for example, uses an internal combustion engine and a battery power supply together. In particular, the hybrid vehicle uses power of the internal combustion engine and power of the motor by efficiently combining them. In other words, when driving using two power sources including an engine and a motor, the hybrid vehicle may promote additional improvement of fuel efficiency by harmoniously operating the engine and the motor.

The battery is an energy source for driving a motor and a direct current/direct current (DC/DC) converter of the hybrid vehicle, and a battery controller which is a controller of the battery monitors a voltage, a current, and a temperature of the battery to generally adjust and manage a state of charge (SOC) of the battery. In general, a charging port for charging a battery is provided in the environmentally friendly vehicle, and the charging port is typically installed at a side surface of an electric vehicle and a charging port cover having a structure similar to an existing oil filling port door is used.

However, when applying the charging port cover structure in the side surface of the electric vehicle, a substantial amount of space for installing a charging port door is required, which causes a limitation in a degree of freedom in shape and design. Therefore, to efficiently utilize the space of the electric vehicle and increase a degree of freedom in shape, a structure in which the charging port door structure is positioned in a radiator grille of the vehicle has been developed.

FIG. 1 is a schematic diagram illustrating an existing radiator grille charging door apparatus according to the related art. FIG. 1 illustrates an opened state of the radiator grille charging door apparatus. Particularly, a door 10 is opened by a 90 degree rotation about a fixed part 11 when the door 10 covers a radiator grille charging port.

The radiator grille charging door apparatus having a protruding open type structure as described above has a simplified structure and is capable of implementing weight reduction and a highly durable design. However, when the door is opened as described, if an external force is applied to the door 10 in a lateral direction, the fixed part 11 may be damaged, and, as a result, the door 10 may be separated from the vehicle body. In order to resolve the problem that the door 10 is separated or broken off from the vehicle body, a robust design in which a reinforcing rib is used at a connecting portion has been applied. However, such a technique may cause an injury to a pedestrian during a collision of the door 10 with the pedestrian.

SUMMARY

The present invention provides a radiator grille charging door apparatus capable of preventing a door from being damaged and separated even when an external force is applied to a charging door of an electric vehicle and protecting a pedestrian. Other objects and advantages of the present invention may be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with an exemplary embodiment of the present invention, a radiator grille charging door apparatus for an electric vehicle for charging the electric vehicle in which a charging port is positioned at an inner side of a radiator grille may include: a charging door having one end formed with a hinge shaft; a hinge connector configured to be coupled to the hinge shaft of the charging door at one side of the hinge connector; a hinge bracket configured to be coupled to an inside of the hinge connector; and a plurality of hinge springs configured to connect the hinge connector and the hinge bracket to each other.

An inner surface of the charging door may be formed with a cover part that covers a charging portion. The hinge shaft of the charging door may be formed with a sliding groove. The charging door may rotate about the hinge shaft when an external force is applied. Additionally, the hinge bracket and the hinge connector may be coupled to the hinge shaft of the charging door. The hinge connector may be an articulated curved shape.

A sliding part in which the hinge bracket is slidable may be formed at one end portion of the hinge connector. In particular, the sliding part of the hinge connector may be formed with a step based on a plane and may include a linear section and a rotation section. The sliding part of the hinge connector may be formed with a locking part that prevents the sliding of the hinge bracket at a first side of the hinge connector. The locking part may be inclined toward an inner side of the sliding part and operate as a leaf spring.

A first rotating part rotating about a fixed shaft in the radiator grille may be formed at a second end portion of the hinge connector. An accommodating part in which the hinge bracket is accommodated may be formed in the hinge connector. The hinge bracket may be formed with a second rotating part that rotates about the hinge shaft of the charging door. The hinge bracket may be slidable in the sliding part formed in the hinge connector.

Additionally, the hinge bracket may be inserted into an accommodating part of the hinge connector. The hinge bracket may be formed with a stopper that stops the sliding.

The hinge springs may be disposed in an accommodating part of the hinge connector and may connect an accommodating part formed in the hinge connector and the first end of the hinge connector. The hinge springs may be arranged in a row.

BRIEF DESCRIPTION OF THE DRAWINGS

A brief description of each drawing is provided to more sufficiently understand drawings used in the detailed description of the present invention.

DETAILED DESCRIPTION

Figure 1:
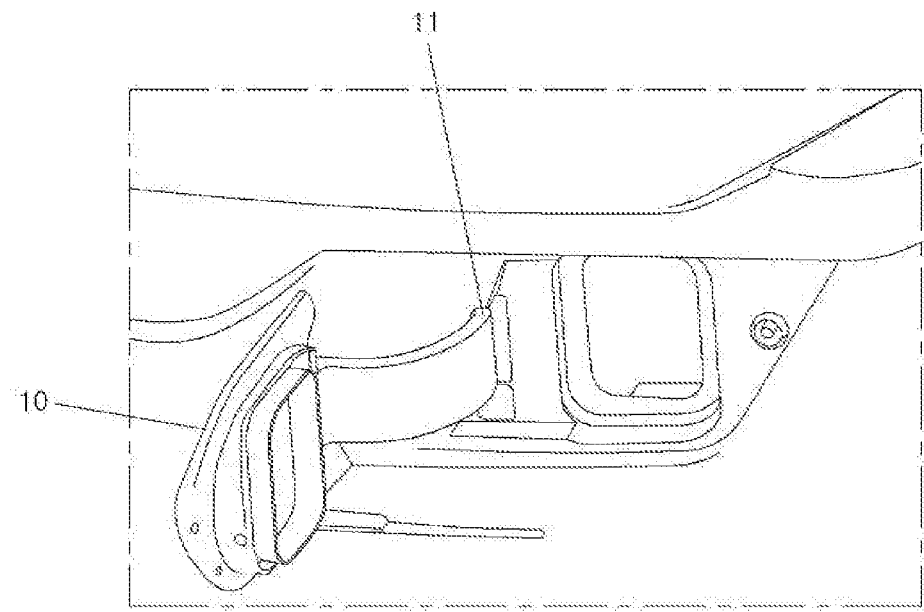
FIG. 1 is a schematic diagram illustrating an existing radiator grille charging door apparatus according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments described hereinbelow are provided for a person skilled in the art to readily understand a technical idea of the present invention, and the present invention is not limited by the exemplary embodiments. Further, matters expressed in the accompanying drawings are illustrated to facilitate explanation of the exemplary embodiments of the present invention and may be different from an actually implemented form.

It is to be understood that when one element is referred to as being "connected to" or "coupled to" another element, it may be connected directly to or coupled directly to another element or be connected to or coupled to another element, having the other element intervening therebetween. Further, the term "connection" used herein may include direct connection and indirect connection between one member and another member, and may mean all physical connection such as adhesion, attachment, fastening, bonding, coupling, and the like.

Further, expressions such as "first" and "second" are expressions used only to distinguish a plurality of components, thus do not limit an order among the components or other features of the components. Singular forms are intended to include plural forms unless the context clearly indicates otherwise. Terms "include" or "have" used in this specification are to specify the presence of stated features, numerals, steps, operations, components, parts, or a combination thereof, and it may be construed that addition of one or more other features, numerals, steps, operations, components, parts, or a combination thereof is possible.

Figure 2:
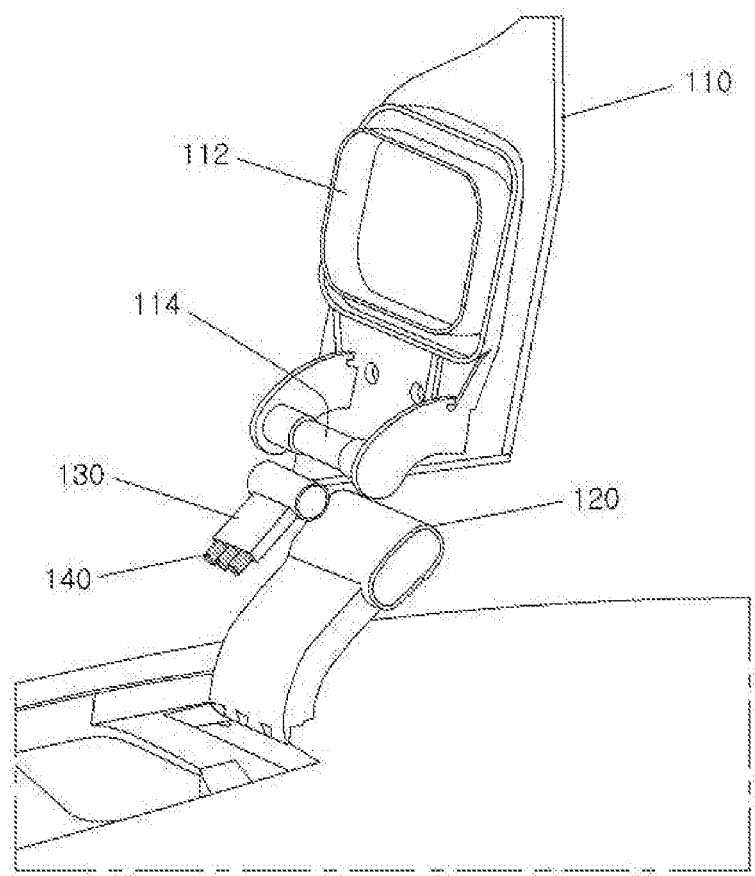
FIG. 2 is a schematic diagram illustrating a radiator grille charging door apparatus according to an exemplary embodiment of the present invention.
Figure 3:
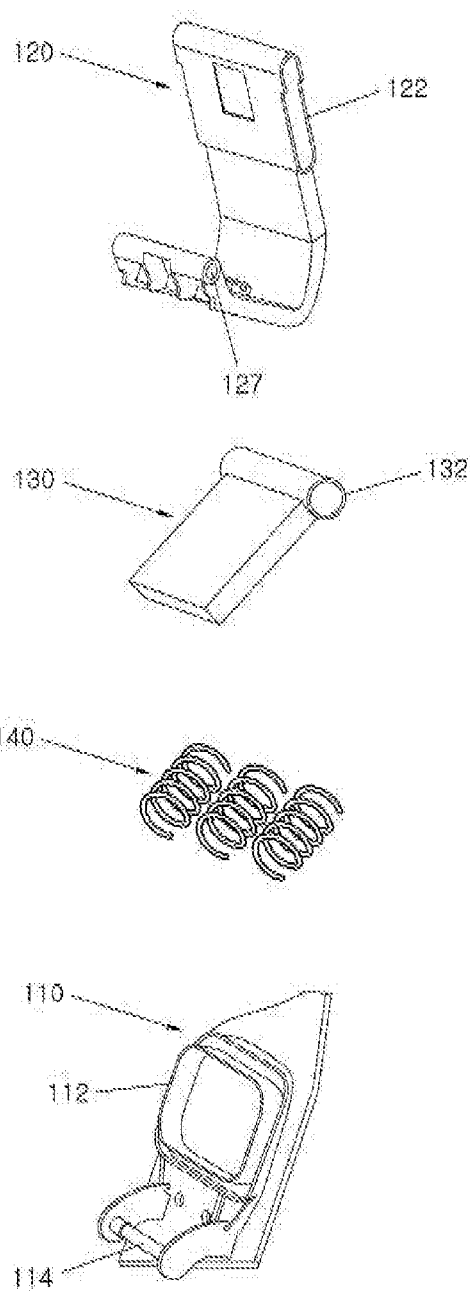
FIG. 3 is a perspective diagram illustrating components included in the radiator grille charging door apparatus according to the exemplary embodiment of the present invention in FIG. 2.
Figure 4:
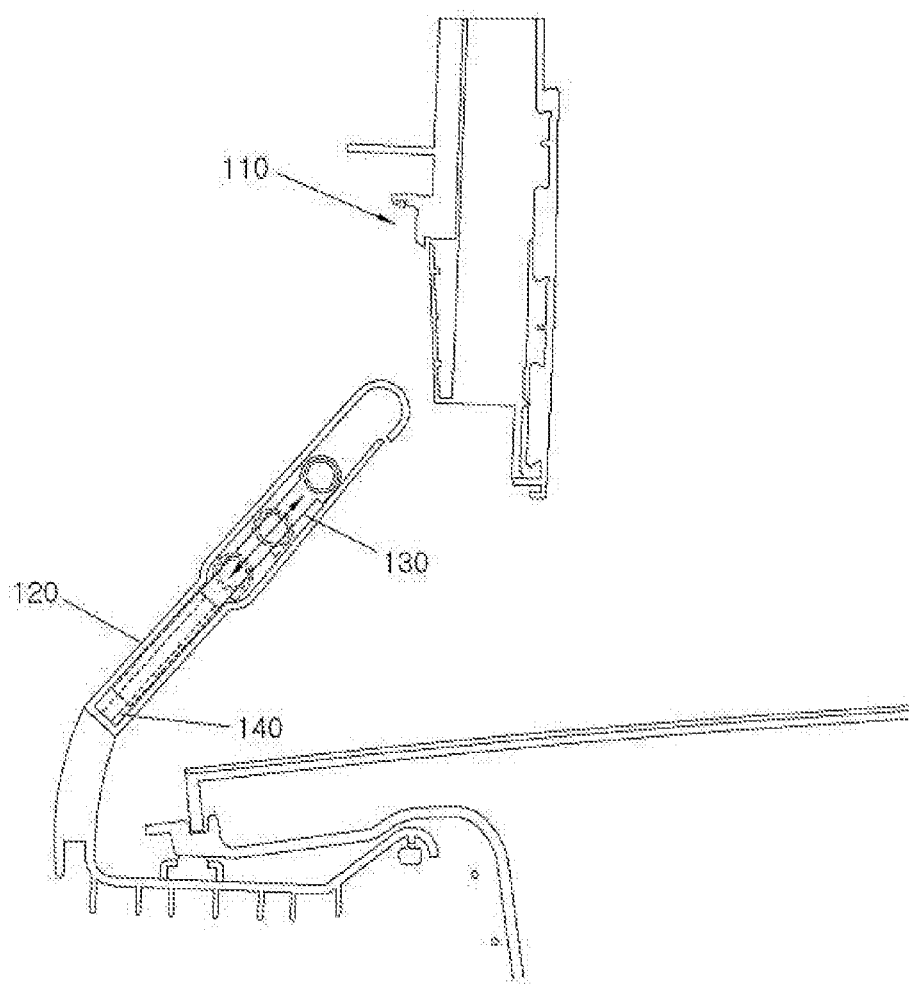
FIG. 4 is a schematic diagram illustrating an internal structure of the radiator grille charging door apparatus according to the exemplary embodiment of the present invention in FIG. 2.
Figure 5:
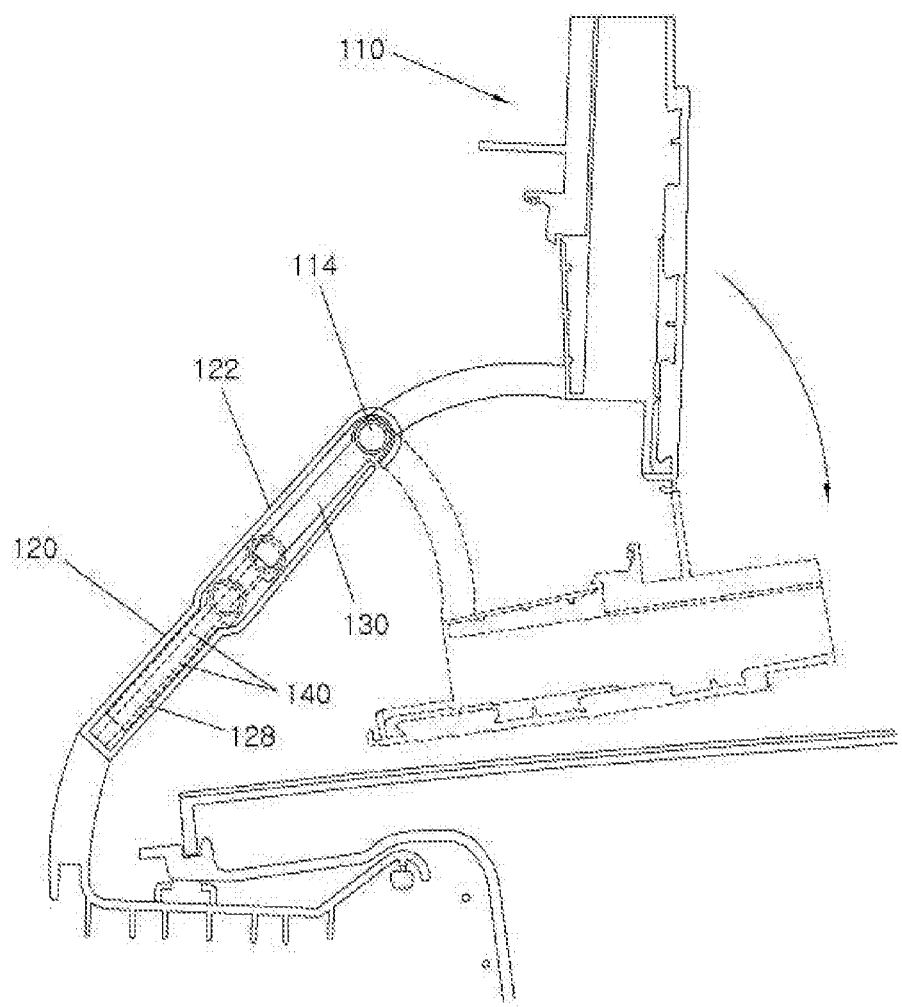
FIG. 5 is a schematic diagram illustrating a state in which an external force is applied to a charging door of the radiator grille charging door apparatus according to the exemplary embodiment of the present invention in FIG. 2.

FIG. 2 is a schematic diagram illustrating a radiator grille charging door apparatus according to an exemplary embodiment of the present invention, FIG. 3 is a perspective diagram illustrating components included in the radiator grille charging door apparatus according to the exemplary embodiment of the present invention in FIG. 2, FIG. 4 is a schematic diagram illustrating an internal structure of the radiator grille charging door apparatus according to the exemplary embodiment of the present invention in FIG. 2, and FIG. 5 is a schematic diagram illustrating a state in which an external force is applied to a charging door of the radiator grille charging door apparatus according to the exemplary embodiment of the present invention in FIG. 2.

Referring to FIGS. 2 to 5, a radiator grille charging door apparatus for an electric vehicle for charging the electric vehicle in which a charging port is positioned at an inner side of a radiator grille may include a charging door 110 having one end formed with a hinge shaft 114, a hinge connector 120 coupled to the hinge shaft 114 of the charging door 110 at one side of the hinge connector 120, a hinge bracket 130 coupled to an inside of the hinge connector 120, and a plurality of hinge springs 140 that connect the hinge connector 120 and the hinge bracket 130 to each other.

In the radiator grille charging door apparatus according to the present invention, an inner surface of the charging door 110 may be formed with a cover part 112 that covers a charging portion. The charging door 110 may have one end formed with the hinge shaft 114 to allow the charging door 110 to rotate about the hinge shaft 114 when an external force is applied when the charging door 110 is open. In one exemplary embodiment, the hinge connector 120 may be an articulated curved shape, and may be coupled to the hinge shaft 114 of the charging door 110 at one side thereof. A sliding part 122 in which the hinge bracket 130 is slidable may be formed at a first end portion of the hinge connector 120.

In addition, a first rotating part 127 that rotates about a fixed shaft in the radiator grille may be formed at a second end portion of the hinge connector 120, and an accommodating part 128 in which the hinge bracket 130 is accommodated may be formed in the middle between the sliding part 122 and the first rotating part 127. According to the present invention, the hinge bracket 130 may be formed with a second rotating part 132 that rotates about the hinge shaft 114 of the charging door 110, and the hinge bracket 130 may be slidable in the sliding part 122 formed in the hinge connector 120 and may be inserted into the accommodating part 128 of the hinge connector 120. In addition, the hinge springs 140 may be disposed in the accommodating part 128 of the hinge connector 120, and arranged in a row to connect the accommodating part 128 formed in the hinge connector 120 and one end of the hinge connector 120.

Figure 6:
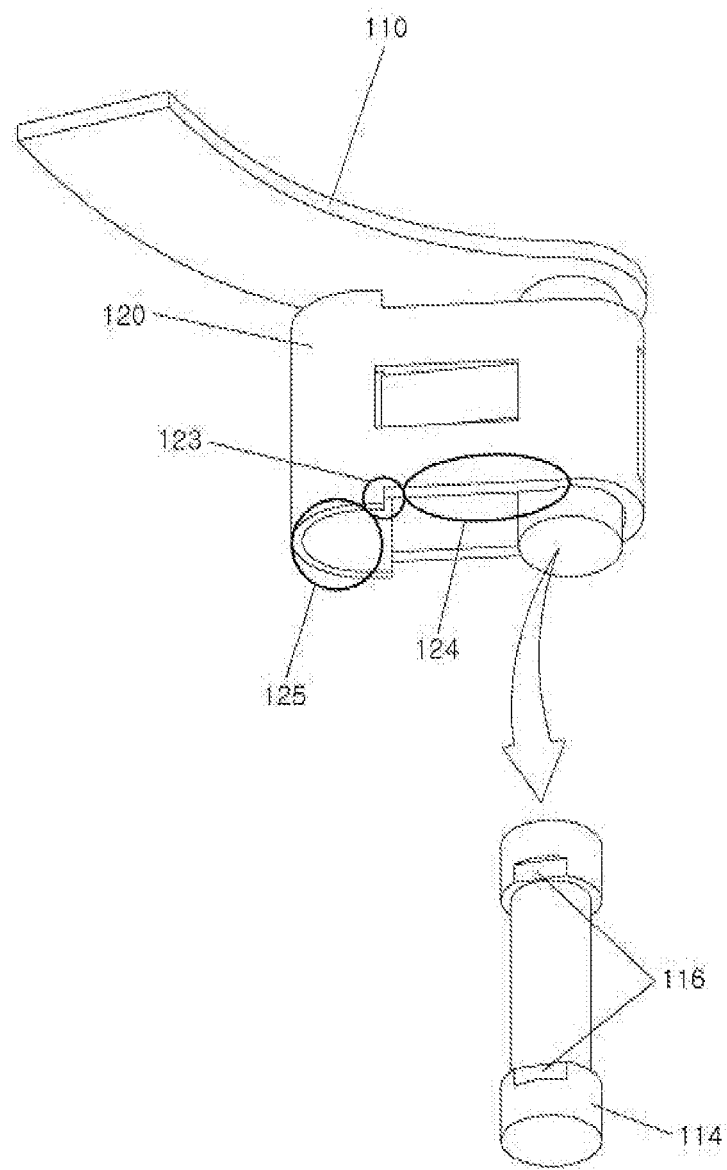
FIG. 6 is a schematic diagram illustrating a slide structure of a hinge connector of the radiator grille charging door apparatus according to the exemplary embodiment of the present invention in FIG. 2.
Figure 7:
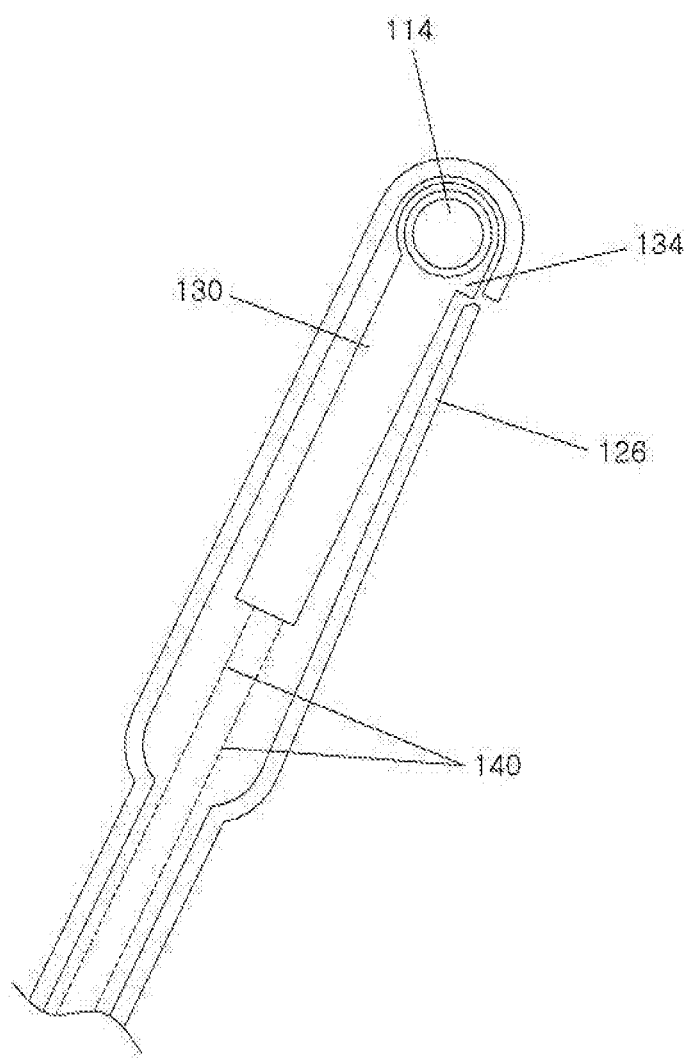
FIG. 7 is a schematic diagram a rotation stop structure of the hinge connector of the radiator grille charging door apparatus according to the exemplary embodiment of the present invention in FIG. 2.

FIG. 6 is a schematic diagram illustrating a slide structure of the hinge connector of the radiator grille charging door apparatus according to the exemplary embodiment of the present invention in FIG. 2, and FIG. 7 is a schematic diagram a rotation stop structure of the hinge connector of the radiator grille charging door apparatus according to the exemplary embodiment of the present invention in FIG. 2.

Referring to FIGS. 6 and 7 together with FIGS. 2 to 5, the hinge connector 120 and the hinge bracket 130 may be coupled to the hinge shaft 114 of the charging door 110. Specifically, the hinge connector 120 may be formed with the sliding part 122 in which the hinge bracket 130 is slidable, and the sliding part 122 of the hinge connector 120 may be formed with a step 123 or notch based on a plane and may include a linear section 124 and a rotation section 125. In other words, the linear section 124 may be disposed at a greater height than the rotation section 125 due to the formation of the step 123.

In addition, the sliding part 122 of the hinge connector 120 may be formed with a sliding groove 116 that facilitates sliding of the hinge shaft 114 of the charging door 110 to which the hinge connector 120 and the hinge bracket 130 are coupled and a locking part 126 that prevents the sliding, in which the locking part 126 is inclined toward an inner side of the sliding part 122 and may operate as a leaf spring. The locking part 126 may be locked to a stopper 134 to stop the sliding of the hinge bracket 130.

Referring to FIGS. 2 to 7, an operational relationship of the radiator grille charging door apparatus according to an exemplary embodiment of the present invention will be described. The hinge connector 120 may have a first end fixed to the inside of the radiator grille, and a second end coupled to the hinge shaft 114 of the charging door 110, the second rotating part 132 of the hinge bracket 130 may be coupled to the hinge shaft 114 of the charging door 110, and the sliding part 122 in which the hinge bracket 130 is slidable may be formed at a first end portion of the hinge connector 120 to allow the hinge bracket 130 to slide in the sliding part 122.

The hinge connector 120 may be formed with the accommodating part 128 accommodating the hinge bracket 130 therein to thus accommodate the hinge bracket 130 in the hinge connector 120 and may slide in the sliding part 122. The hinge bracket 130 coupled to the charging door 110 may slide in the sliding part 122 of the hinge connector 120, and the hinge springs 140 may be disposed in the accommodating part 128 of the hinge connector 120 and connect the accommodating part 128 formed in the hinge connector 120 and the first end of the hinge connector 120, to allow the hinge bracket 130 to slide in the sliding part 122 by an external force and slide in an opposite direction by the hinge springs 140.

Further, the hinge connector 120 may be formed with the step 123 to divide the linear section 124 and the rotation section 125, and the hinge bracket 130 may slide in the linear section 124. The hinge shaft 114 of the charging door 110 may be formed with the sliding groove 116 to facilitate the sliding. The hinge bracket 130 may slide in the linear section 124, and the locking part 126 that prevents the sliding of the hinge bracket 130 may be formed at one side of the sliding part 122 to operate as a leaf spring and may be locked to the stopper 134 that stops the sliding of the hinge bracket 130, thereby stopping the sliding.

In addition, when a strong impact is applied, the hinge shaft 114 of the charging door 110 rotates to a maximum in the rotation section 125 as shown by an arrow in FIG. 5, and in a process of restoring the charging door 110, when a user restores the rotated charging door 110 to an original position, the locking part 126 locked to the stopper 134 is released and restored to an original position by the springs 140.

In accordance with the exemplary embodiment of the present invention, the radiator grille charging door apparatus may prevent damage to a charging door of an electric vehicle even when an external force is applied to the charging door of the electric vehicle, and protect a pedestrian even during a collision with the pedestrian, thereby improving durability of the charging door apparatus and safety of pedestrians.

It may be understood by those skilled in the art to which the present invention pertains that the present invention may be implemented as other specific forms without changing the spirit or essential feature thereof. Therefore, it is to be noted that the exemplary embodiments described above merely are the most preferred embodiments selected from multiple applicable exemplary embodiments and suggested to help understanding of those skilled in the art and the technical idea of the present invention is not limited or restricted by the exemplary embodiment suggested above, and various changes, additions, and modifications may be made without departing from the technical idea of the present invention, and other equivalent embodiments may be possible.

It should be interpreted that the scope of the present invention is defined by the following claims rather than the above-mentioned detailed description and all modifications or alterations deduced from the meaning, the scope, and equivalences of the claims are included in the scope of the present invention. In addition, terms and words used in the present specification and claims are defined based on a principle that the inventors can appropriately define the concepts of terms in order to describe their own inventions in best mode and are not to be construed as only having a general or dictionary meaning. Further, the order of the configurations described in the above processes need not necessarily be performed in the temporal sequence, and as long as the gist of the present invention may be satisfied, even when the order of the respective configurations and steps is changed, the processes may belong to the scope of the present invention.

What is claimed is:

1. A radiator grille charging door apparatus for an electric vehicle for charging the electric vehicle in which a charging port is positioned at an inner side of a radiator grille, comprising:
  a charging door having one end formed with a hinge shaft;

a hinge connector coupled to the hinge shaft of the charging door at one side of the hinge connector;

a hinge bracket configured to be coupled to an inside of the hinge connector; and a plurality of hinge springs configured to connect the hinge connector and the hinge bracket to each other.

2. The radiator grille charging door apparatus of claim 1, wherein an inner surface of the charging door is formed with a cover part that covers a charging portion.

3. The radiator grille charging door apparatus of claim 1, wherein the hinge shaft of the charging door is formed with a sliding groove.

4. The radiator grille charging door apparatus of claim 1, wherein the charging door rotates about the hinge shaft when an external force is applied.

5. The radiator grille charging door apparatus of claim 1, wherein the hinge bracket and the hinge connector are coupled to the hinge shaft of the charging door.

6. The radiator grille charging door apparatus of claim 1, wherein the hinge connector is an articulated curved shape.

7. The radiator grille charging door apparatus of claim 1, wherein a sliding part in which the hinge bracket is slidable is formed at a first end portion of the hinge connector.

8. The radiator grille charging door apparatus of claim 7, wherein the sliding part of the hinge connector is formed with a step based on a plane.

9. The radiator grille charging door apparatus of claim 7, wherein the sliding part of the hinge connector includes a linear section and a rotation section.

10. The radiator grille charging door apparatus of claim 7, wherein the sliding part of the hinge connector is formed with a locking part that prevents sliding of the hinge bracket at one side of the hinge connector.

11. The radiator grille charging door apparatus of claim 10, wherein the locking part is inclined toward an inner side of the sliding part and operates as a leaf spring.

12. The radiator grille charging door apparatus of claim 7, wherein a first rotating part that rotates about a fixed shaft in the radiator grille is formed at a second end portion of the hinge connector.

13. The radiator grille charging door apparatus of claim 1, wherein an accommodating part in which the hinge bracket is disposed is formed in the hinge connector.

14. The radiator grille charging door apparatus of claim 12, wherein the hinge bracket is formed with a second rotating part that rotates about the hinge shaft of the charging door.

15. The radiator grille charging door apparatus of claim 1, wherein the hinge bracket is slidable in a sliding part formed in the hinge connector.

16. The radiator grille charging door apparatus of claim 1, wherein the hinge bracket is inserted into an accommodating part of the hinge connector.

17. The radiator grille charging door apparatus of claim 7, wherein the hinge bracket is formed with a stopper that stops sliding thereof within the sliding part.

18. The radiator grille charging door apparatus of claim 1, wherein the hinge springs are disposed in an accommodating part of the hinge connector.

19. The radiator grille charging door apparatus of claim 1, wherein the hinge springs connect an accommodating part formed in the hinge connector and one end of the hinge connector.

20. The radiator grille charging door apparatus of claim 1, wherein the hinge springs are arranged in a row.

* * * * *